(12) United States Patent
Ikeda

(10) Patent No.: US 8,854,487 B2
(45) Date of Patent: Oct. 7, 2014

(54) IMAGING APPARATUS AND IMAGING METHOD

(75) Inventor: Takeshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 13/131,431

(22) PCT Filed: Dec. 7, 2009

(86) PCT No.: PCT/JP2009/006662
§ 371 (c)(1),
(2), (4) Date: May 26, 2011

(87) PCT Pub. No.: WO2010/073508
PCT Pub. Date: Jul. 1, 2010

(65) Prior Publication Data
US 2011/0228128 A1    Sep. 22, 2011

(30) Foreign Application Priority Data

Dec. 27, 2008   (JP) .................. 2008-335480

(51) Int. Cl.
| | | |
|---|---|---|
| H04N 5/225 | (2006.01) | |
| G03B 7/097 | (2006.01) | |
| H04N 5/235 | (2006.01) | |
| H04N 5/232 | (2006.01) | |
| G03B 13/36 | (2006.01) | |
| H04N 5/238 | (2006.01) | |

(52) U.S. Cl.
CPC .............. *H04N 5/2351* (2013.01); *G03B 7/097* (2013.01); *H04N 5/2352* (2013.01); *H04N 5/23245* (2013.01); *G03B 13/36* (2013.01); *H04N 5/238* (2013.01); *H04N 5/23212* (2013.01)
USPC ......... 348/220.1; 348/345; 348/370; 348/371

(58) Field of Classification Search
USPC ................................. 348/220.1, 345, 370, 371
See application file for complete search history.

(56) References Cited

U.S. PATENT DOCUMENTS

| | | | |
|---|---|---|---|
| 2005/0099523 A1* | 5/2005 | Konishi et al. ................. | 348/345 |
| 2006/0239654 A1* | 10/2006 | Kawamura ..................... | 386/107 |
| 2008/0273094 A1* | 11/2008 | Kunieda ...................... | 348/220.1 |
| 2009/0231454 A1* | 9/2009 | Miura ......................... | 348/220.1 |
| 2011/0063463 A1* | 3/2011 | Ejima et al. ................. | 348/220.1 |

FOREIGN PATENT DOCUMENTS

| | | |
|---|---|---|
| CN | 1856022 A | 11/2006 |
| JP | 7-67027 A | 3/1995 |
| JP | 2001-281530 A | 10/2001 |
| JP | 2004-072550 A | 3/2004 |
| JP | 2005-198068 A | 7/2005 |
| JP | 2005-260733 A | 9/2005 |
| JP | 2006-325194 A | 11/2006 |
| JP | 2007-267000 A | 10/2007 |

* cited by examiner

*Primary Examiner* — Anthony J Daniels
(74) *Attorney, Agent, or Firm* — Canon U.S.A., Inc. IP Division

(57) ABSTRACT

A focusing operation is started before desired exposure according to a second program diagram is obtained when a program diagram is switched from a first program diagram to be used in a first mode to the second program diagram to be used in a second mode based on a light metering value.

7 Claims, 7 Drawing Sheets

IMAGING APPARATUS AND IMAGING METHOD

TECHNICAL FIELD

The present invention relates to an imaging apparatus capable of changing timing of autofocus control when a driving method of an image sensor is changed, and an imaging method for the imaging apparatus.

BACKGROUND ART

Currently, many cameras (i.e., imaging apparatuses) can capture both a moving image and a still image. There are many products in which a moving image capturing mode and a still image capturing mode are switched via a mechanical switch or the like. More specifically, when a user intends to capture the moving image, the user switches the mechanical switch to the moving image capturing mode, and then presses a moving image capturing start trigger button. When the user intends to capture the still image, the user switches the mechanical switch to the still image capturing mode, and then presses a still image capturing trigger button. However, as a stress free imaging apparatus, it is desirable to allow the moving image or the still image to be captured without switching the mechanical switch or the like.

Accordingly, a currently adopted switching method is as follows. The imaging apparatus is normally operated with the moving image capturing mode and when the still image capturing trigger button is pressed, the still image is captured by switching the mode to the still image capturing mode. After the still image is captured, when any operation is not performed for a predetermined time, the mode returns to the moving image capturing mode again. In such a case, conventionally, when the still image is captured, an autofocus operation is performed after exposure control is determined. This is a reasonable order because, in the exposure control, when a diaphragm is operated, depth of field is changed due to a change in the aperture diameter of the diaphragm. This is a technique that allows the exposure control and the autofocus control to be accurately performed. This technique is discussed in Japanese Patent Application Laid-Open No. 2001-281530.

However, since the autofocus control is executed after the exposure control, a release time lag Tlg is determined by the following equation:

$$Tlg = Tex + Tfo + Tcl \quad (1)$$

where exposure control time is Tex, autofocusing time is Tfo, and mechanical shutter close time is Tcl.

If the exposure control and the focus control are executed based on an image signal output from an image sensor, the control is performed with feedback control. Thus, the exposure control time Tex of approximately 0.5 sec. and the autofocusing time Tfo of approximately 0.5 sec are required.

Further, the mechanical shutter close time is 0.005 sec. Thus, the exposure control time Tex and the autofocus time Tfo are dominant in the release time lag Tlg. The release time lag may cause a shutter opportunity miss.

CITATION LIST

Patent Literature

PTL 1: Japanese Patent Application Laid-Open No. 2001-281530

SUMMARY OF INVENTION

The present invention is directed to an imaging apparatus the release time lag of which is short when the camera is switched from a moving image capturing mode to a still image capturing mode to capture a still image.

According to an aspect of the present invention, an imaging apparatus includes an image sensor configured to convert light incident through a lens into an electric signal, an image sensor driver configured to drive the image sensor in a first mode and a second mode different in a driving method, a light metering value acquisition unit configured to acquire a light metering value from an electric signal output from the image sensor, an exposure controller configured to control a luminance level of an object image to be acquired according to a first program diagram to be used in the first mode and a second program diagram to be used in the second mode based on the light metering value acquired by the light metering value acquisition unit to obtain an appropriate luminance level, and a focus controller for focusing an object based on the electric signal output from the image sensor, and wherein a focusing operation by the focus controller is started before appropriate exposure according to the second program diagram is obtained when a program diagram to be used is switched from the first program diagram to the second program diagram.

According to another aspect of the present invention, an imaging method includes converting light incident through a lens into an electric signal by an image sensor, driving the image sensor in a first mode or a second mode different in a driving method, acquiring a light metering value from an electric signal output from the image sensor, controlling a luminance level of an object image to be acquired according to a first program diagram to be used in the first mode and a second program diagram to be used in the second mode based on the acquired light metering value to a desired luminance level, and focusing an object based on the electric signal output from the image sensor, wherein a focusing operation is started before desired exposure according to the second program diagram is obtained when a program diagram to be used is switched from the first program diagram to the second program diagram.

ADVANTAGEOUS EFFECTS OF INVENTION

According to an exemplary embodiment, when a camera is switched from a moving image capturing mode to a still image capturing mode in order to capture a still image, the start timing of the focus control can be made quicker. Thus, a release time lag can be reduced.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Drawings to be used to describe the exemplary embodiments are schematic diagrams. In order to facilitate understanding, a size and a shape of each unit are suitably exaggeratedly illustrated. Further, in the following description, specific numeral values, configurations, and operations are illustrated. However, the present invention is not limited to those, and they can suitably be changed.

EXAMPLES

Figure 1:
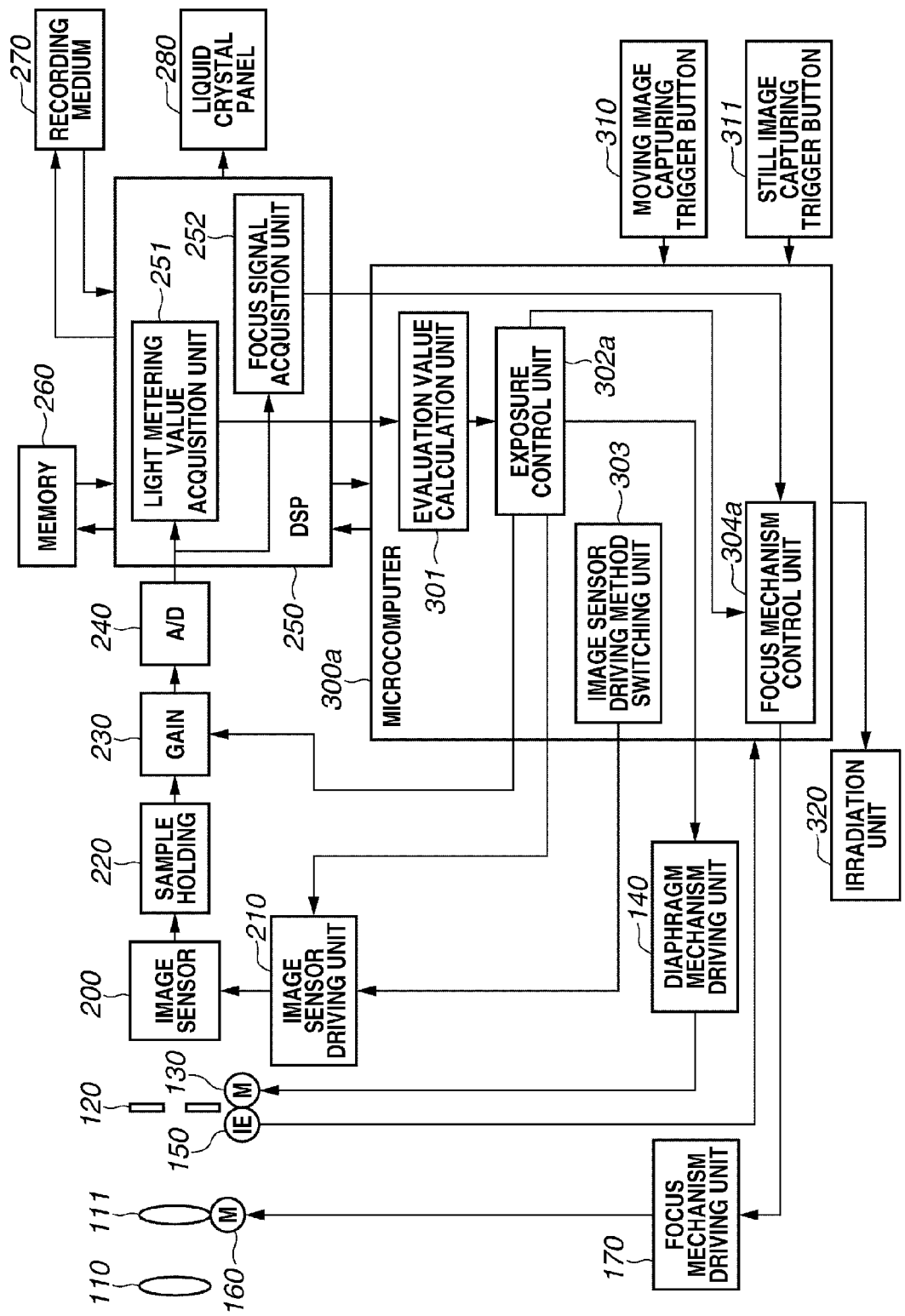
FIG. 1 is a block diagram illustrating a configuration of an imaging apparatus according to an exemplary embodiment of the present invention.

FIG. 1 is a block diagram illustrating a configuration of an imaging apparatus according to an exemplary embodiment of the present invention. An imaging lens 110 forms an image capturing optical system together with a focus lens 111 (described later) and is used to form an object image on an image sensor 200. The focus lens 111 is moved in an optical axis direction, thereby focusing the object image on the image sensor 200.

A focus driving motor 160 generates a driving force for driving the focus lens 111 in the optical axis direction. A focus mechanism driving unit 170 drives the focus driving motor 160.

A diaphragm mechanism 120 causes exposure to be changed by controlling the amount of incident light. A diaphragm driving motor 130 generates a driving force for driving the diaphragm mechanism 120. A diaphragm mechanism driving unit 140 is one of a plurality of exposure change units, which causes exposure to be changed by driving the diaphragm driving motor 130. A diaphragm position detection unit 150 detects the position of the diaphragm mechanism 120.

The image sensor 200 executes photoelectric conversion for converting incident light into an electric signal. An image sensor driving unit 210 controls the image sensor 200 to read a signal subjected to photoelectric conversion.

Further, the image sensor driving unit 210 controls whether an electric charge output from the image sensor 210 is read by addition, non-addition, or thinning. Furthermore, the image sensor driving unit 210 controls storage time of the signal to execute control as a so-called electronic shutter. Thus, the image sensor driving unit 210 functions as one of a plurality of exposure change units that cause exposure to be changed.

A sample holding unit 220 samples the signal subjected to photoelectric conversion by the image sensor 200. A gain unit 230 executes automatic gain control (AGC) for electrically amplifying the signal. This corresponds to a change in sensitivity in capturing an image. Accordingly, the gain unit 230 is one of a plurality of exposure change units for causing exposure to be changed.

An analog to digital converter (hereinafter, referred to as A/D converter) 240 converts an analog signal output from the gain unit 230 into a digital signal. A digital signal processing unit (hereinafter, referred to as DSP) 250 has a control function of adding a synchronizing signal to generate a standard television signal after gamma correction is executed and then processing such as color separation and color-difference matrixes is applied.

A light metering value acquisition unit 251 receives data that is output from the A/D converter 240 and obtains a light metering value of each pixel. A focus signal acquisition unit 252 receives data that is output from the A/D converter 240 and acquires a focus signal.

A memory 260 stores an image processed by the DSP 250. A storage medium 270 records moving images and still images. A liquid crystal panel 280 displays the images.

A microcomputer 300a issues a processing command to the DSP 250. The microcomputer 300a includes an evaluation value calculation unit 301, an exposure control unit 302a, an image sensor driving method switching unit 303, and a focus mechanism control unit 304a.

The evaluation value calculation unit 301 calculates a light metering value for determining whether a captured image is in appropriate exposure condition based on a luminance value output from the light metering value acquisition unit 251.

The exposure control unit 302a receives the output result of the evaluation value calculation unit to calculate based on a program diagram (refer to FIGS. 2 and 3) that includes a preset program for determining which exposure change unit (exposure control parameters such as a diaphragm, an AGC, and an electronic shutter) is operated by which amount.

Which exposure change unit (exposure control parameters such as a diaphragm, an AGC, and an electronic shutter) is operated by which amount is determined in order to provide a correct luminance level of an object image after the output result of the evaluation value calculation unit is received. Then, the exposure control unit 302a issues a command to each driving unit.

The image sensor driving method switching unit 303 issues a command to the image sensor driving unit 210 for instructing that the driving of the image sensor 200 is executed in a mode (i.e., addition mode, non-addition mode, or thinning mode), and that an angle of view is 16:9 or 4:3.

The focus mechanism control unit 304a controls the focus mechanism driving unit 170 based on the focus signal acquired by the focus signal acquisition unit 252. A user operates a moving image capturing trigger button 310 when the user intends to start capturing a moving image. A user operates a still image capturing trigger button 311 when the user intends to start capturing a still image.

In the imaging apparatus according to the present exemplary embodiment, the image sensor 200 is first driven in a moving image capturing mode (first mode). At this time, the command output from the image sensor driving method switching unit 303 is addition reading with an aspect ratio of 16:9.

When the moving image capturing trigger button 310 is pressed, the driving method of the image sensor 200 is not changed and a signal output to the DSP 250 is stored in the storage medium 270. When the moving image capturing trigger button 310 is pressed again, the recording ends.

When the still image capturing trigger button 311 is pressed in this moving image capturing mode with the signal not being recorded in the storage medium 270, the image sensor driving method switching unit 303 switches the driving method of the image sensor 200 to thinning reading with an aspect ratio of 4:3. Program diagrams are simultaneously switched in response to the switching.

The exposure control unit 302a executes switching of the program diagrams. The program diagrams include two types of program diagrams, i.e., a first program diagram for a moving image and a second program diagram for a still image.

It is because the moving image is basically captured by a shutter speed of 1/60 sec., while the still image is captured by a high shutter speed of 1/120 sec. or the like in order to eliminate the effects of a hand shake and an object movement as much as possible.

Figure 2:
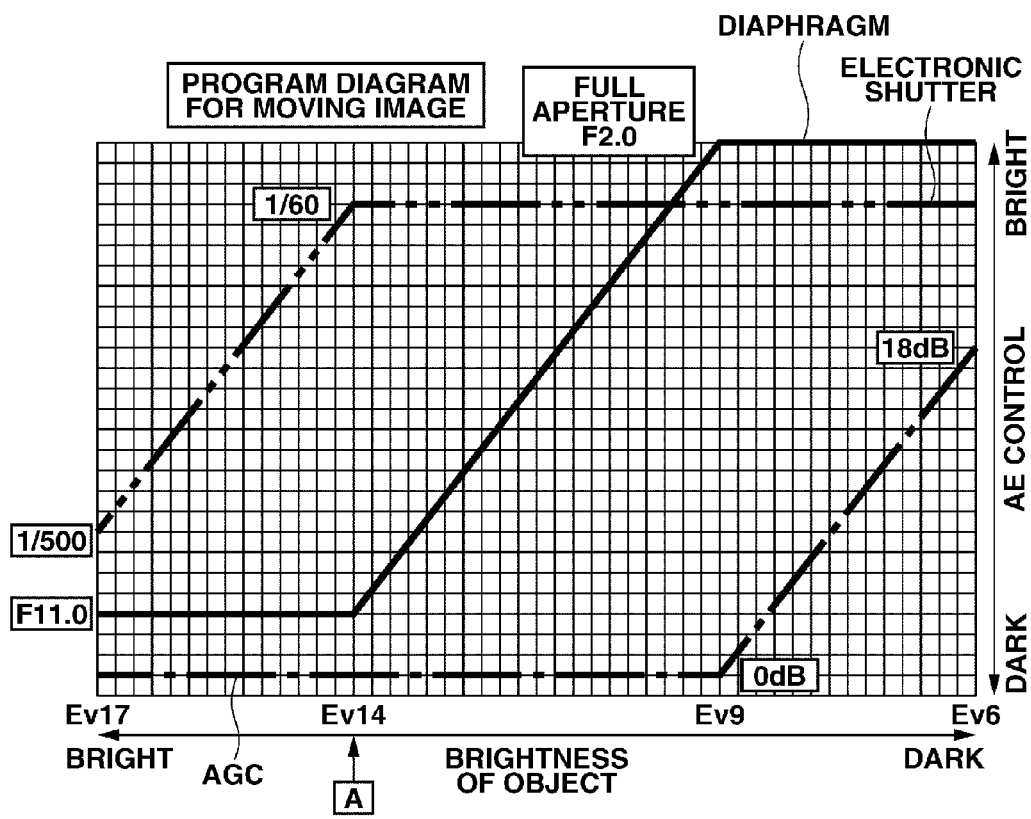
FIG. 2 illustrates a first program diagram for a moving image.

FIG. 2 illustrates a first program diagram for a moving image. The horizontal axis represents brightness of an object. The left side represents a brighter object and the right side represents a darker object. Further, the vertical axis represents the control value of each parameter for exposure control. The closer to the upper side the control value is controlled, the brighter the image to be captured becomes. The closer to the lower side the control value is controlled, the darker the image to be captured becomes.

As the control order of parameters, a shutter speed is controlled to be shifted from 1/500 sec. to 1/60 sec., a diaphragm is controlled to be shifted from F 11 to F 2.0, and AGC is controlled to be shifted from 0 dB to 18 dB, from the side whose brightness of the object is bright.

Figure 3:
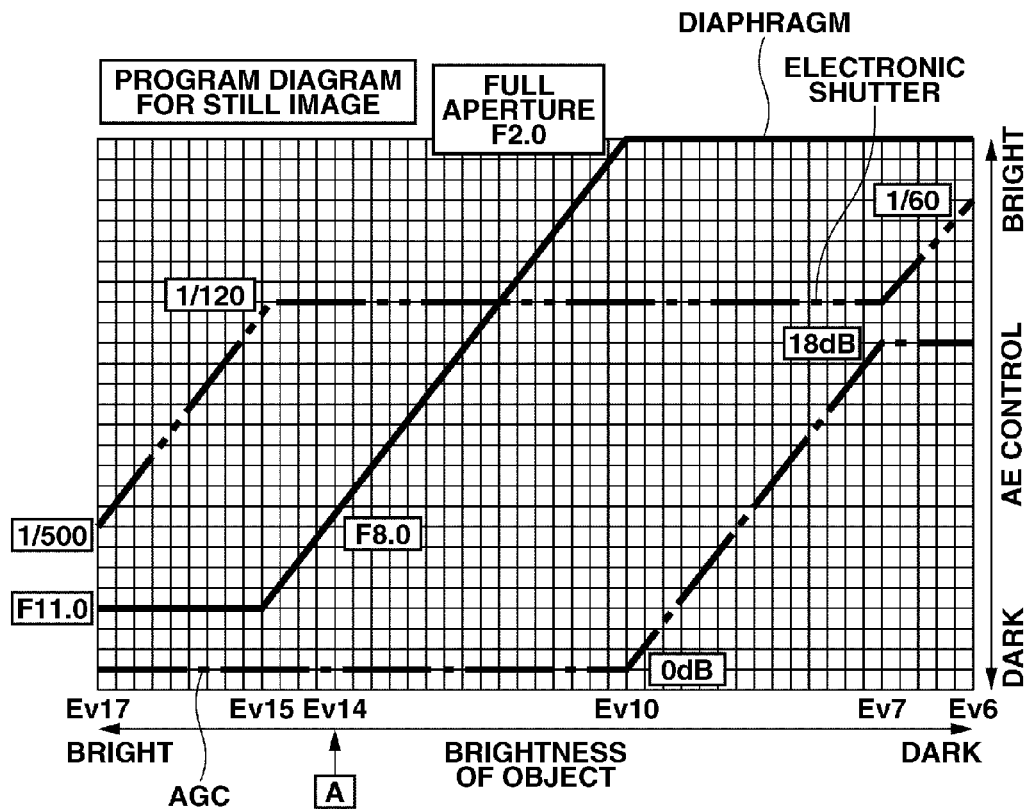
FIG. 3 illustrates a second program diagram for a still image.

FIG. 3 illustrates a second program diagram for a still image. In the second program diagram, a shutter speed is controlled to be shifted from 1/500 sec. to 1/120 sec., a diaphragm is controlled to be shifted from F 11 to F 2.0, and AGC is controlled to be shifted from 0 dB to 18 dB, and the shutter speed is controlled to be shifted from 1/120 sec. to 1/60 sec. again. In other words, the parameters are controlled from the side whose brightness of the object is bright.

When the current brightness of the object is Ev 14 (brightness of A in FIGS. 2 and 3) and exposure is appropriate, the parameters are controlled to be a diaphragm of F 11, a shutter speed of 1/60 sec., and AGC of 0 dB. When switched to the still image capturing mode in this state, the control is shifted to the location of Ev 14 on the still image program diagram in FIG. 3. The exposure is shifted to a diaphragm of F 8.0, a shutter speed of 1/120 sec., and AGC of 0 dB.

Thus, switching of program diagrams is controlled so as to be shifted to a diaphragm value, a shutter speed, and an AGC value so that the same EV value can be obtained between the moving image and the still image. Accordingly, when switching, it is not necessary to use a light metering value to be output from the light metering value acquisition unit 251.

It is determined whether the light metering value output from the light metering value acquisition unit 251 is equal to a preset target value after the program diagrams are switched. Then, when the light metering value is different from the target value, each parameter for automatic exposure (AE) is shifted (tracing on the program diagram for the still image) until the light metering value becomes equal to the target value.

Thus, there are two reasons to execute the exposure control again after the program diagrams are switched. A first reason is that since an aspect ratio is changed from 16:9 to 4:3, an image capturing range is changed and then an appropriate brightness of the object image is also changed. A second reason is that the light metering value to be output from the light metering value acquisition unit 251 is different between the moving image and the still image.

When only the target value is changed, the program diagram can be corrected by using the predetermined changing amount of the target value. However, since the image capturing area is changed by the change in an aspect ratio, the light metering value and the difference of light metering value from the target value are not known until light metering is performed. Thus, in order to obtain an appropriate exposure value after the image capturing mode is changed from the moving image to the still image, it is necessary to perform light metering again.

In a comparative example (described later), directly after the diagrams are changed by the exposure control unit 302a, the exposure control is executed based on the light metering value output from the light metering value acquisition unit 251.

On the other hand, in the present exemplary embodiment, directly after the diagrams are switched by the exposure control unit 302a, a command is first issued to the focus mechanism control unit 304a so as to start an autofocus operation. The command can be issued because a condition close to an appropriate exposure is obtained directly after being switched to the still image capturing program diagram since switching corresponding to the same EV value of the object is executed when the diagrams are switched from the moving image capturing program diagram to the still image capturing program diagram.

When switching of the program diagrams is not appropriate for the brightness of the object, a diaphragm value is significantly changed and a depth of field is significantly changed in order to provide appropriate exposure. As a result, the autofocus operation is affected disadvantageously thereby. Accordingly, it is important that the program diagrams are correctly switched from the diagram for the moving image to the diagram for the still image.

When the focus mechanism control unit 304a receives an autofocus operation start command, the autofocus operation is started. This operation is a preliminary and temporary autofocus operation for searching an approximate focus position that maximizes the contrast of the object. Even if in-focus position is obtained at this time, the autofocus has not been completed.

That is because there is a possibility that the exposure control operation may be simultaneously executed with the autofocus operation and the depth of field may be changed. In this case, the autofocus operation described above functions as the preliminary and temporary autofocus operation.

The autofocus operation in the present exemplary embodiment is so-called video signal AF operation in which a focus lens is moved so as to obtain a maximum contrast value based on the contrast of an image signal output from the image sensor 200.

The evaluation value calculation unit 301 receives the output of the light metering value acquisition unit 251 generated based on the signal read out from the image sensor 200 simultaneously with the start of the temporary autofocus operation and calculates the evaluation value of exposure.

When the calculated result is larger than the target value, each parameter for exposure is shifted so as to trace on the program diagram for the still image in FIG. 3 toward the left side. When the calculated result is smaller than the target value, each parameter for exposure is shifted so as to trace on the program diagram for the still image in FIG. 3 toward the right side.

The reason why the evaluation value of exposure is different from the target value even if the program diagrams are correctly switched according to the brightness of the object is as follows.

Figure 4:
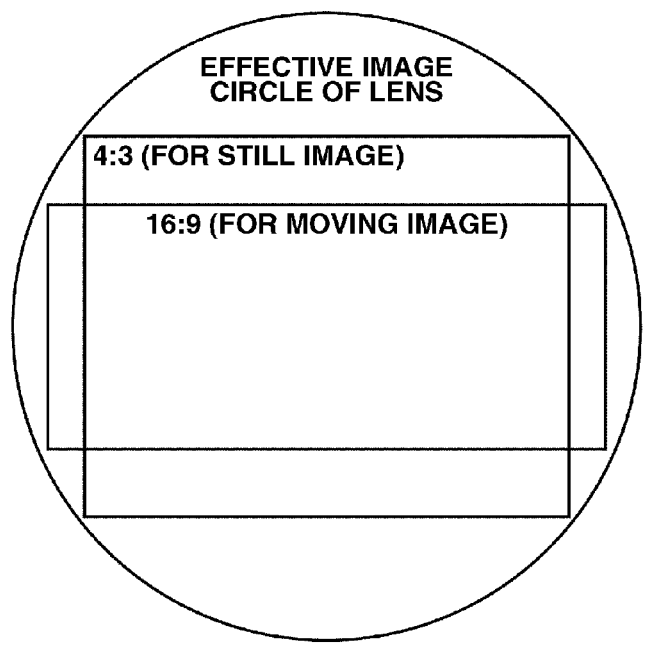
FIG. 4 illustrates a difference between a moving image capturing mode and a still image capturing mode in an image capturing area.

A first reason is a change in an image capturing range between the moving image capturing mode and the still image capturing mode. FIG. 4 illustrates a difference in the image capturing range between the moving image capturing mode and the still image capturing mode. In the moving image, an aspect ratio is 16:9 and in the still image, an aspect ratio is 4:3. Thus, after the image capturing mode is switched to the still image capturing mode, a change in the object occurs so that the object whose top and bottom have not been captured in the moving image capturing mode is captured, and the object whose right and left have been captured is not captured.

A second reason is that the evaluation value is changed by the exposure control but the target values of the evaluation values are different. In order to solve these two differences, the exposure evaluation value is acquired after the program diagram is switched and the exposure is changed according to the program diagram.

Thus, after setting an appropriate exposure value for capturing the still image, the exposure control unit 302a issues a command to the diaphragm mechanism driving unit 140, the image sensor driving unit 210, and the gain unit 230 so as to secure the operation and lock the exposure control. Thereafter, the exposure control unit 302a issues focusing permission to the focus mechanism control unit 304a so that focusing can be completed. The focus mechanism control unit 304a searches a final focusing position. After the focusing is completed, an operation for capturing the still image into the imaging apparatus is executed.

As described above, by pressing the still image capturing trigger button 311, switching from the moving image capturing mode to the still image capturing mode is performed, when the still image is captured. With this operation, the start timing of the autofocus control is made earlier. Thus, the start timing of the autofocus control between the exposure control and the autofocus control (i.e., main factors of a release time lag) is made earlier, and the release time lag becomes as follows.

First, exposure control time Tex' is the total of time Tex1 to be elapsed until switching of the program diagram is completed and time Tex2 to be elapsed to perform later exposure correction and locking. This time is equal to the exposure control time in a comparative example that will be described later. Accordingly, the exposure control time Tex' is given by the following equation (2).

$$Tex=Tex'=Tex1+Tex2 \quad (2)$$

Further, time Tfo' required for autofocus operation is given by the following equation (3):

$$Tfo=Tfo'=Tfo1+Tfo2 \quad (3)$$

where a temporary autofocus operation time is Tfo1 and an autofocus operation time required for final focusing is Tfo2.

Thus, time Tlg' to capture the still image after the still image capturing trigger button 311 is pressed is given by the following equation (4), and the release time lag is reduced.

$$Tlg>Tlg'=tex1+Tfo2+Tcl \quad (4)$$

Figure 5:
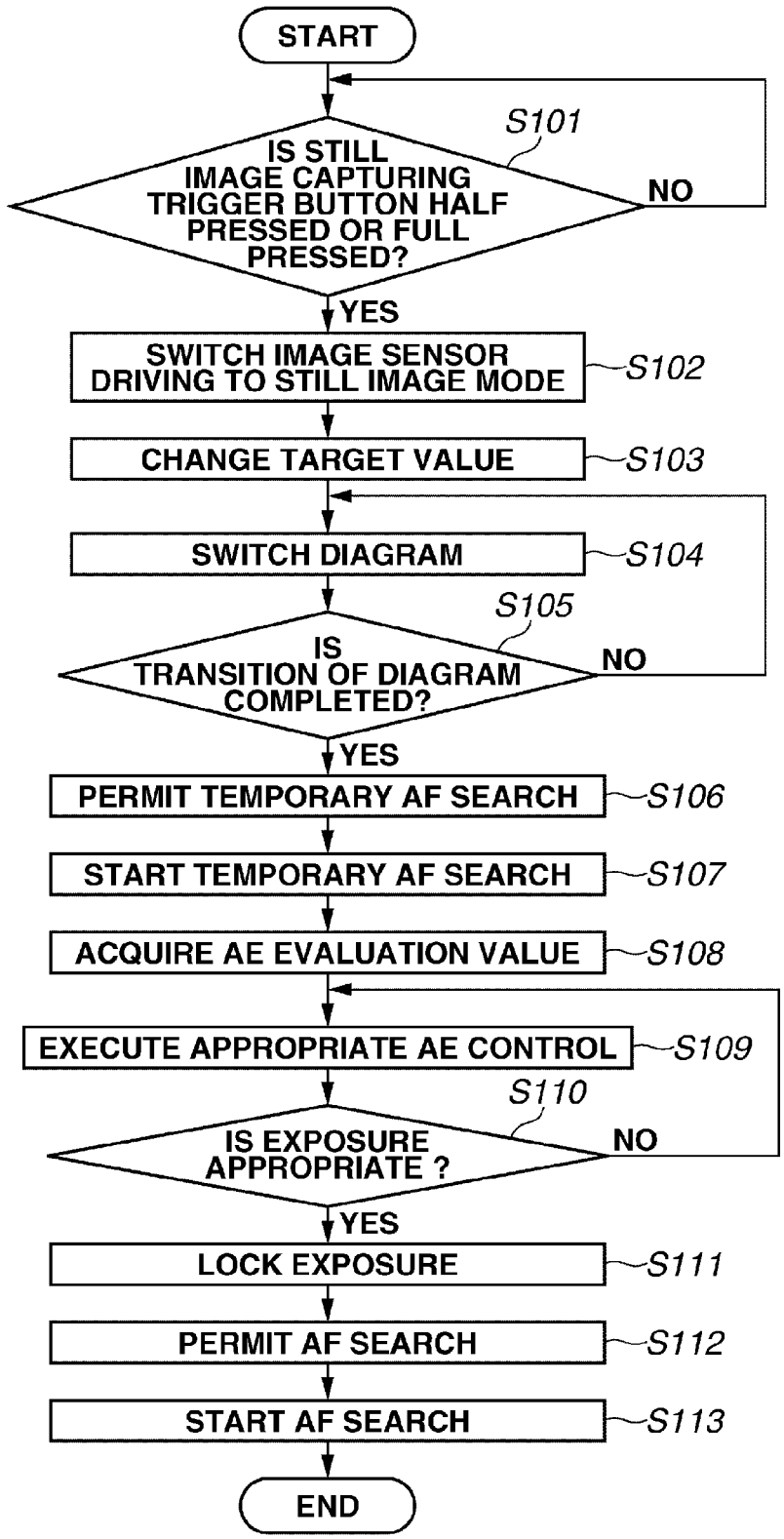
FIG. 5 is a flowchart illustrating an operation of the imaging apparatus according to an exemplary embodiment of the present invention.

Next, the operation of the imaging apparatus according to the present exemplary embodiment will be described. FIG. 5 is a flowchart illustrating the operation of the imaging apparatus in the present exemplary embodiment. In step S101, it is determined whether the still image capturing trigger button 311 is half pressed or full pressed. When the still image capturing trigger button 311 is half pressed or full pressed (YES in step S101), the processing proceeds to step S102. When the still image capturing trigger button 311 is neither half pressed nor full pressed (NO in step S101), step s101 is repeated to wait for processing.

In step S102, driving of the image sensor 200 is switched from the moving image capturing mode to the still image capturing mode and an aspect ratio is switched from 16:9 to 4:3. Then, the processing proceeds to step S103. In step S103, the target value of exposure is changed from a value for the moving image to a value for the still image. Then, the processing proceeds to step S104. In step S104, the program diagram is switched from the program diagram for the moving image to the program diagram for the still image. Then, the processing proceeds to step S105.

In step S105, it is determined whether parameters on the program diagram (i.e., diagraph value, a shutter speed, and AGC) switched in step S104 have reached respective target values. When each reaches the target value (YES in step S105), the processing for switching the program diagram ends. Then, the processing proceeds to step S106.

When each parameter on the program diagram has not reached the target value (NO in step S105), processing for switching the program diagram continues.

In step S106, the exposure control unit 302a sets up a temporary AF search start flag, which means start permission of temporary autofocus control, simultaneously with completion of transition of the program diagram. Then, the processing proceeds to step S107. In step S107, the flag set up in step S106 causes the temporary autofocus search for searching an approximate focusing position to start. Then, the processing proceeds to step S108.

In step S108, each parameter on the shifted program diagram is secured so as not to be changed, the light metering value of exposure is acquired from an image signal output from the image sensor 200, and evaluation calculation is executed. Then, the processing proceeds to step S109.

In step S109, the evaluation value acquired in step S108 and the target value of the preset evaluation value are compared to change each parameter of exposure control on the program diagram so that the evaluation value and the target value of the evaluation value becomes equal to each other. Then, the processing proceeds to step S110.

In step S110, it is determined whether the evaluation value of exposure (i.e., the result changed in step S109) reaches the target value. When the evaluation value does not reach the target value (NO in step S110), the processing returns to step S109 and the exposure control is executed again. On the other hand, when the evaluation value reaches the target value (YES in step S110), the processing proceeds to step S111.

In step S111, each parameter of the exposure control is locked so as not to be changed. Then, the processing proceeds to step S112. In step S112, an AF search start flag, which means start permission of the autofocus control, is set up. Then, the processing proceeds to step S113. In step S113, an autofocus operation for adjusting the focus on an object is started.

Thus, the operation of autofocus is executed at the stage earlier than that in the conventional autofocus operation including a comparative example that will be described later. Thus, the release time lag can be reduced. However, only one improvement may be required. That is a case in which an evaluation value signal for autofocus acquired by the focus signal acquisition unit 252 is small when the luminance of the object is low.

Normally, in such a case, a method to be generally used is to illuminate the object by an irradiation unit 320 (e.g., light emitting diode (LED) light) only when focus control is executed as auxiliary for the focus control. When this LED light is turned on, the LED light needs to be turned on simultaneously with the focus control or until before the focus control is started.

However, in the operation according to the present exemplary embodiment described above, since the exposure control and the autofocus control are executed in parallel, when the LED light is turned on for the autofocus to illuminate the object, the exposure control is erroneously executed.

Accordingly, when the still image capturing trigger button 311 is pressed to change the image capturing mode from the moving image capturing mode to the still image capturing mode, and the program diagram is switched by the exposure control unit 302a, the EV value of the object is acquired from the exposure control unit.

When it is determined that the object is dark based on the EV value, since the LED light is used for the autofocus control, the autofocus control is not executed until the exposure control is completed. The autofocus operation will be executed on the similar timing to the conventional or the later-described comparative example.

Figure 6:
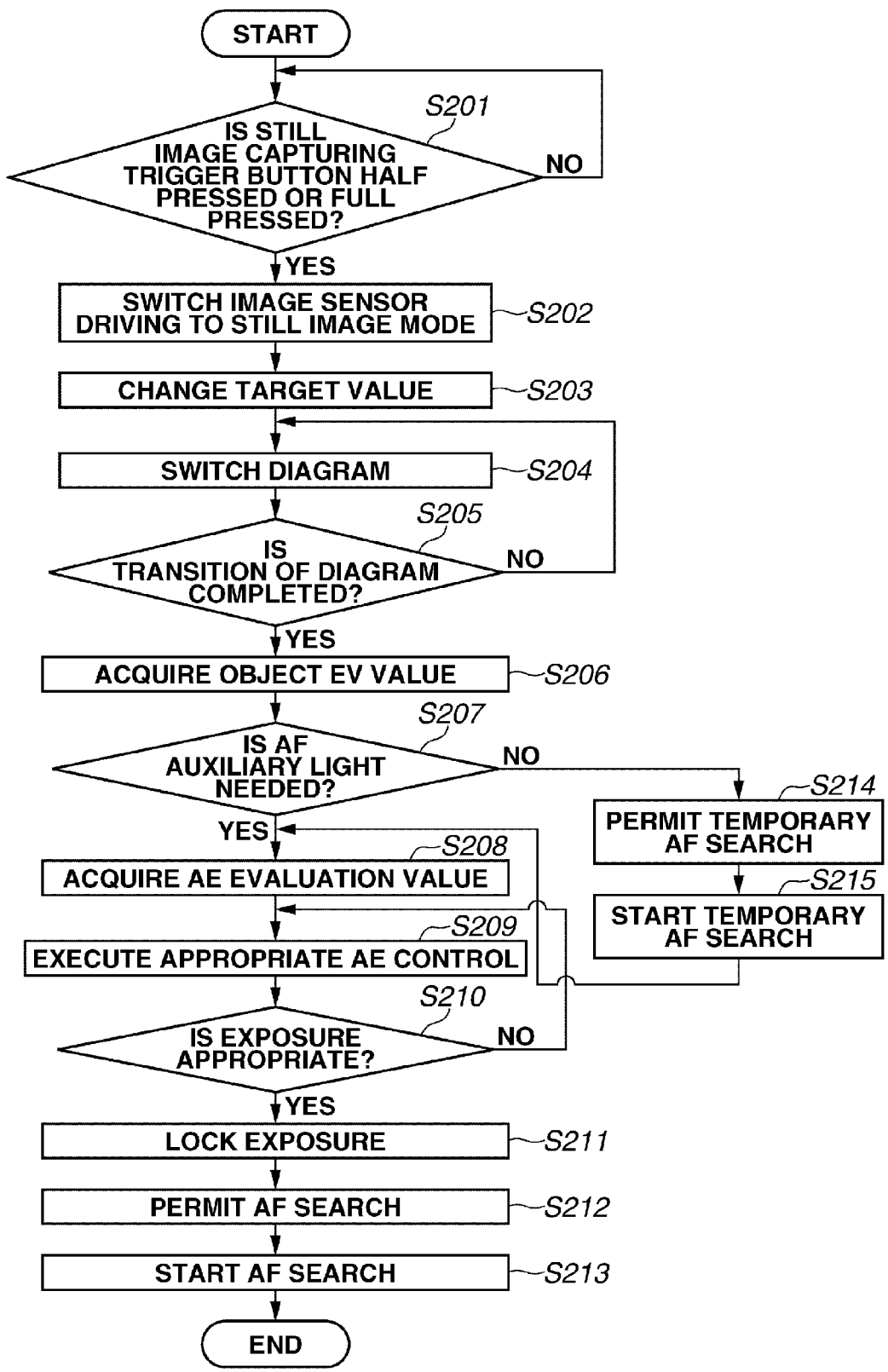
FIG. 6 is a flowchart illustrating an operation when light emission of autofocus (AF) auxiliary light is considered.

FIG. 6 is a flowchart illustrating an operation when light emission of autofocus (AF) auxiliary light is considered. In step S201, it is determined whether the still image capturing trigger button 311 is half pressed or full pressed. When the still image capturing trigger button 311 is half pressed or full pressed (YES in step S201), the processing proceeds to step S202. When the still image capturing trigger button 311 is neither half pressed nor full pressed (NO in step S201), step S201 is repeated to wait for processing.

In step S202, driving of the image sensor 200 is switched from the moving image capturing mode to the still image capturing mode and the aspect ratio is switched from 16:9 to 4:3. Then, the processing proceeds to step S203. In step S203, the target value of exposure is changed from the value for the moving image to the value for the still image. Then, the processing proceeds to step S204. In step S204, the program diagram is switched from that for the moving image to that for the still image. Then, the processing proceeds to step S205.

In step S205, it is determined whether each parameter (a diaphragm, a shutter speed, and AGC) on the program diagram that is switched to in step S204 reaches a target value. When each parameter reaches the target value (YES in step S205), the program diagram switching processing ends. Then, the processing proceeds to step S206. When each parameter on the program diagram has not reached the target value (NO in step S205), the processing returns to step s204 and the program diagram switching processing continues.

In step S206, the EV value indicating brightness of an object is acquired. Then, the processing proceeds to step S207. In step S207, determination whether the AF auxiliary light is needed is executed based on the Ev value of the object acquired in step S206. If it is needed (YES in step S207), the processing proceeds to step S208. If it is not needed (NO in step S207), the processing proceeds to step S214.

In step S214, the exposure control unit 302a sets up a temporary AF search start flag, which means start permission of temporary autofocus control, simultaneously with completion of transition of the program diagram. Then, the processing proceeds to step S215. In step S215, the flag set up in step S214 causes the temporary autofocus search for searching an approximate focusing position to start. Then, the processing proceeds to step S208.

In step S208, each parameter on the switched program diagram is secured so as not to be changed, the light metering value of exposure is acquired from an image signal output from the image sensor 200, and evaluation calculation is executed thereon. Then, the processing proceeds to step S209. In step S209, the evaluation value acquired in step S208 and the target value of the preset evaluation value are compared to change each parameter of exposure control on the program diagram so that the evaluation value and the target value of the evaluation value become equal to each other. Then, the processing proceeds to step S210.

In step S210, it is determined whether the evaluation value of exposure (i.e., a result operated in step S209) reaches the target value. When the evaluation value does not reach the target value (NO in step S210), the processing returns to step S209 and the exposure control is executed again. Further, when the evaluation value reaches the target value (YES in step S210), the processing proceeds to step S211.

In step S211, each parameter of the exposure control is locked so as not to be changed. Then, the processing proceeds to step S212. In step S212, an AF search start flag, which means start permission of autofocus control, is set up. Then, the processing proceeds to step S213. In step S213, an autofocus operation for adjusting the focus on an object is started.

Figure 7:
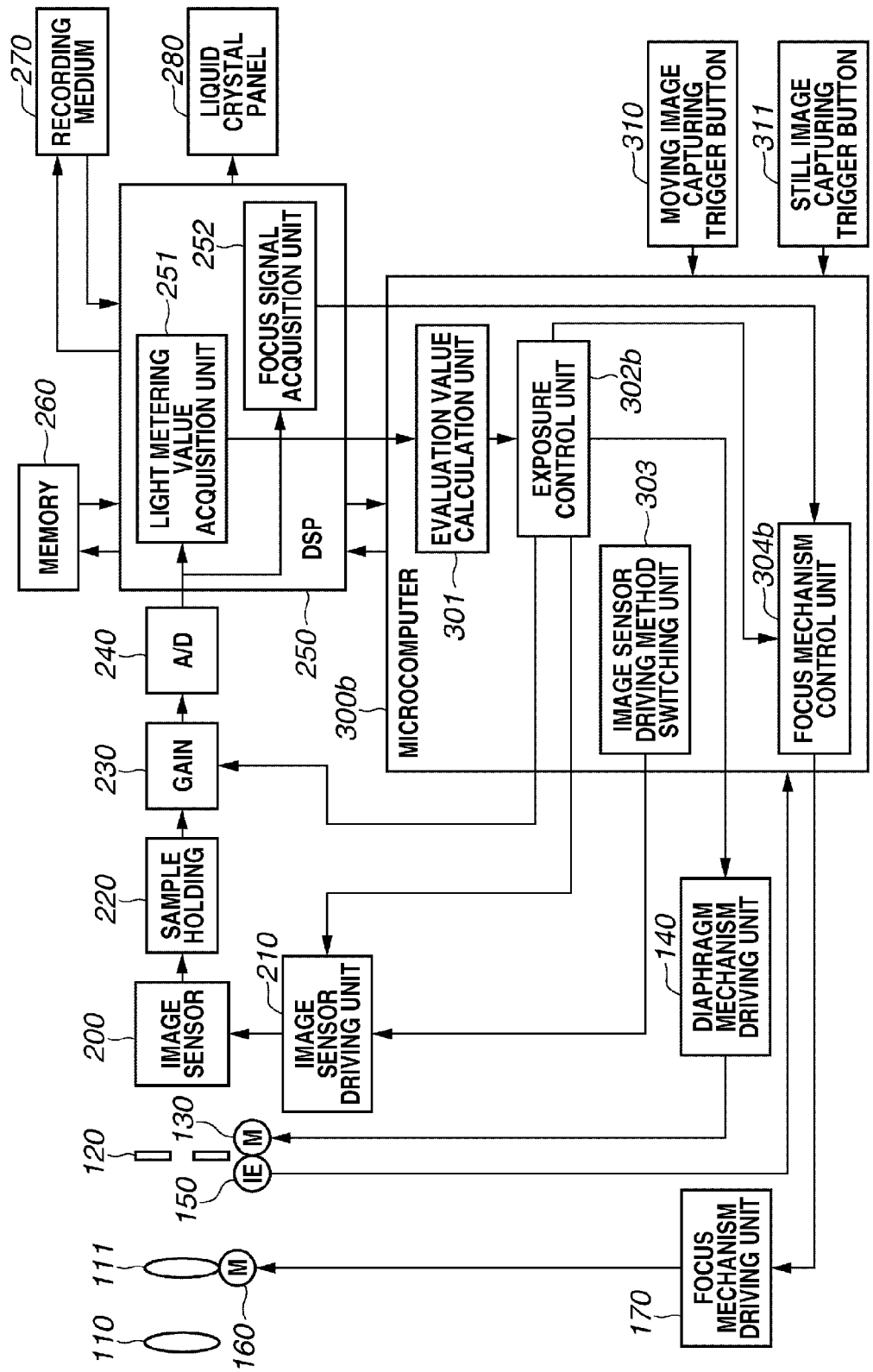
FIG. 7 is a block diagram illustrating a configuration of an imaging apparatus of a comparative example.

In order to make characteristics of the operation in the present exemplary embodiment described above definite, a case will be described in which an imaging apparatus having a configuration close to that in the present exemplary embodiment is exemplified as a comparative example. In the above imaging apparatus, the image capturing mode is switched from a moving image capturing mode to a still image capturing mode similarly to the conventional operation. FIG. 7 is a block diagram illustrating a configuration of the imaging apparatus of the comparative example.

The comparative example is different from the exemplary embodiment described above in that a microcomputer 300b is different in operation from the microcomputer 300a described in the exemplary embodiment and that the irradiation unit 320 is omitted. Thus, units that function similarly to those in the above-described exemplary embodiment is assigned with the same reference numerals and descriptions thereof will suitably be omitted.

The microcomputer 300b includes an exposure control unit 302b and a focus mechanism control unit 304b. The exposure control unit 302b is a block corresponding to the exposure control unit 302a in the exemplary embodiment. The focus mechanism control unit 304b is a block corresponding to the focus mechanism control unit 304a in the exemplary embodiment.

In the comparative example, the operations of the exposure control unit 302b and the focus mechanism control unit 304b are different from those in the exemplary embodiment. The different operations will be described below.

In the imaging apparatus of the comparative example, first, the image sensor 200 is driven by the moving image capturing mode (first mode). At this time, a command output from the image sensor driving method switching unit 303 is addition reading with an aspect ratio of 16:9.

When the moving image capturing trigger button 310 is pressed, a signal input to the DSP 250 is stored in the storage medium 270 without changing the driving method of the image sensor 200. When the moving image capturing trigger button 310 is pressed again, the recording ends.

When the still image capturing trigger button 311 is pressed when the moving image is not being recorded in the storage medium 270 in the moving image capturing mode, the image sensor driving method switching unit 303 switches the driving method of the image sensor 200 to thinning reading with an aspect ratio of 4:3. A program diagram is simultaneously switched. The operation up to here is similar to that in the above-described exemplary embodiment.

Then, when the light metering value output from the light metering value acquisition unit 251 becomes equal to the target value and it is determined that an appropriate exposure value is obtained, the exposure value is locked. Then, the focus mechanism control unit 304b included in the microcomputer 300b send a command to the focus mechanism driving unit 170 so as to execute the focus operation based on a focus signal acquired by the focus signal acquisition unit 252. In response to this, the focus driving motor 160 is driven, a focus lens is operated, and autofocus search is started.

Figure 8:
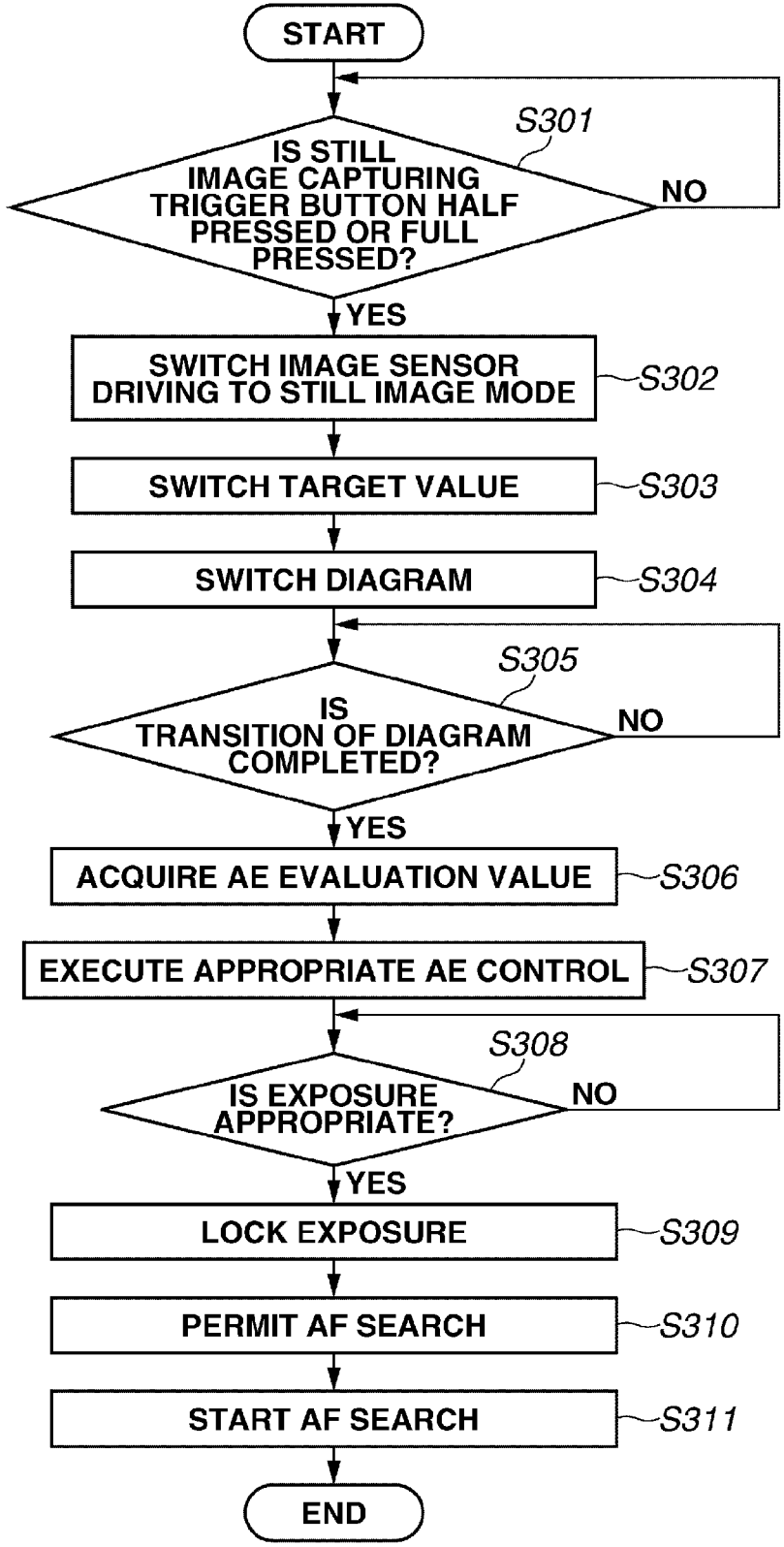
FIG. 8 is a flowchart illustrating an operation of the comparative example.

FIG. 8 is a flowchart illustrating the operation of a comparative example. First, in step S301, it is determined whether the still image capturing trigger button 311 is half pressed or full pressed. When the still image capturing trigger button 311 is half pressed or full pressed (YES in step S301), the processing proceeds to step S302. When the still image capturing trigger button 311 is neither half pressed nor full pressed (NO in step S301), step S301 is repeated to wait for processing.

In step S302, driving of the image sensor 200 is switched from the moving image capturing mode to the still image capturing mode and the aspect ratio is switched from 16:9 to 4:3. Then, the processing proceeds to step S303. In step S303, the target value of exposure is changed from a value for the moving image to a value for the still image. Then, the processing proceeds to step S304. In step S304, a program diagram is switched from that for the moving image to that for the still image. Then, the processing proceeds to step S305.

In step S305, it is determined whether each of parameters (a diaphragm, a shutter speed, and AGC) on the program diagram switched in step S304 reaches a target value. When each of the parameters reaches the target value (YES in step S305), the program diagram switching processing ends. Then, the processing proceeds to step S306. When each of the parameters on the program diagram does not reach the target value (NO in step S305), the program diagram switching processing continues.

In step S306, each parameter on the switched program diagram is secured so as not to be changed, the light metering value of exposure is acquired from an image signal output from the image sensor 200, and evaluation calculation is executed. Then, the processing proceeds to step S307. In step S307, the evaluation value acquired in step S306 and the target value of the preset evaluation value are compared to change each parameter of the exposure control on the program diagram so that the evaluation value and the target value of the evaluation value becomes equal to each other. Then, the processing proceeds to step S308.

In step S308, it is determined whether the evaluation value of exposure (a result changed in step S307) reaches the target value. When the evaluation value does not reach the target value (NO in step S308), the processing returns to step S307 and the exposure control is executed again. On the other hand, when the evaluation value reaches the target value (YES in step S308), the processing proceeds to step S309.

In step S309, each parameter of the exposure control is locked so as not to be changed. Then, the processing proceeds to step S310. In step S310, an AF search start flag, which means start permission of autofocus control, is set up. Then, the processing proceeds to step S311. In step S311, an autofocus operation for adjusting the focus on an object is started.

In the above-described conventional example, the release time lag Tlg is represented by previously indicated equation (1). Thus, the release time lag Tlg becomes longer than the release time lag Tlg' in the present exemplary embodiment.

As described above, according to the present exemplary embodiment, the still image capturing trigger button 311 is pressed, thereby switching the image capturing mode from a moving image capturing mode to a still image capturing mode. When the still image is captured, start timing of the focus control is made earlier. Thus, the release time lag can be reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2008-335480, filed Dec. 27, 2008, which is hereby incorporated by reference herein in its entirety.

The invention claimed is:

1. An imaging apparatus comprising:
    an image sensor configured to convert light incident through a lens into an electric signal;
    an image sensor driver configured to drive the image sensor in a first mode and a second mode different from the first mode in a driving method;
    a light metering value acquisition unit configured to acquire a light metering value from an electric signal output from the image sensor;
    an exposure controller configured to control an exposure amount according to a first program diagram to be used in the first mode and a second program diagram to be used in the second mode based on the light metering value acquired by the light metering value acquisition unit to obtain an appropriate exposure amount; and
    a focus controller for performing a focusing operation based on the electric signal output from the image sensor,
    wherein in response to switching the driving method of the image sensor from the first mode to the second mode by the image sensor driver, the exposure controller switches a program diagram from the first program diagram to the second program diagram, and the focus controller starts the focusing operation before the appropriate exposure amount according to the second program diagram is obtained,
    and wherein the focusing operation is a preliminary focusing operation to be executed before a focusing operation for finally focusing an object.

2. The imaging apparatus according to claim 1, further comprising:
    an irradiation unit configured to irradiate an object; and
    an irradiation determination unit configured to determine whether to irradiate the object by the irradiation unit based on the light metering value;
    wherein when the irradiation determination unit determines not to irradiate the object after the exposure controller switches the program diagram from the first program diagram to the second program diagram, the focus controller starts the focusing operation before the appropriate exposure amount according to the second program diagram is obtained.

3. The imaging apparatus according to claim 2, wherein when the irradiation determination unit determines to irradiate the object after the exposure controller switches the program diagram from the first program diagram to the second program diagram, the focusing operation is not executed before the appropriate exposure amount according to the second program diagram is obtained.

4. The imaging apparatus according to claim 1, wherein the first mode is a mode for moving image and the second mode is a mode for still image.

5. The imaging apparatus according to claim 1, wherein the exposure controller changes at least two of a diaphragm, a shutter, and a gain.

6. The imaging apparatus according to claim 1, wherein the focus controller starts the focusing operation for finally focusing an object after the appropriate exposure amount according to the second program diagram is obtained.

7. An imaging method comprising:
   converting light incident through a lens into an electric signal by an image sensor;
   driving the image sensor in a first mode and a second mode different from the first mode in a driving method;
   acquiring a light metering value from an electric signal output from the image sensor;
   controlling an exposure amount according to a first program diagram to be used in the first mode and a second program diagram to be used in the second mode based on the acquired light metering value to obtain an appropriate exposure amount; and p performing a focusing operation based on the electric signal output from the image sensor,
wherein in response to switching the driving method of the image sensor from the first mode to the second mode, a program diagram is switched from the first program diagram to the second program diagram and the focusing operation is started before the appropriate exposure amount according to the second program diagram is obtained,
and wherein the focusing operation is a preliminary focusing operation to be executed before a focusing operation for finally focusing an object.

\* \* \* \* \*